(12) United States Patent
Rashidi

(10) Patent No.: US 6,220,293 B1
(45) Date of Patent: *Apr. 24, 2001

(54) MULTIPLE OUTLETS SELF-ACTUATED IRRIGATION VALVE

(76) Inventor: Ardishir Rashidi, 1408 Forest St., Upland, CA (US) 91784

( * ) Notice: Subject to any disclaimer, the term of this patent is extended or adjusted under 35 U.S.C. 154(b) by 0 days.

This patent is subject to a terminal disclaimer.

(21) Appl. No.: 09/368,777

(22) Filed: Aug. 5, 1999

Related U.S. Application Data

(63) Continuation of application No. 08/850,476, filed on May 5, 1997, now Pat. No. 5,944,052.

(51) Int. Cl.⁷ ............................. F16K 31/06; A01G 27/00
(52) U.S. Cl. ............................... 137/624.18; 137/624.12; 137/883; 239/70
(58) Field of Search ................... 137/624.11, 624.18, 137/624.12, 883, 624.19, 887; 239/67, 70

(56) References Cited

U.S. PATENT DOCUMENTS

| | | | |
|---|---|---|---|
| 4,256,133 | * | 3/1981 | Coward et al. ............. 137/624.11 X |
| 4,492,247 | * | 1/1985 | Lockwood ................. 137/624.14 X |
| 5,944,052 | * | 8/1999 | Rashidi ..................... 137/624.18 |

* cited by examiner

Primary Examiner—Kevin Lee
(74) Attorney, Agent, or Firm—John J. Connors; Connors & Associates

(57) ABSTRACT

A novel irrigation valve having a single central inlet and a plurality of radially located outlets each covered by a sliding disk valve. Each disk valve is manually operable. and in automatic mode is operated by the interference action of an innovative indexing mechanism which uses the hydraulic pressure of the inlet for its operation. a single three-way solenoid valve is energized to actuate a piston within the indexing mechanism while a pin-teeth engagement of a cylinder-indexer assembly converts the linear motion of a piston rod into a rotary motion of an indexing arm. A battery operated timer controls the time intervals between each incremental rotation of an indexing arm in sequence until it is returned to its home position. The housing of the valve is compact and of low profile, thereby simplifying its manufacturing, assembling, installation and maintenance and reducing cost. Although suitable for use in controlling the distribution of water in an automatic irrigation circuit, it can be modified and be adapted for control of variety of liquids in fluid handling applications.

3 Claims, 10 Drawing Sheets

SECTION 1-1

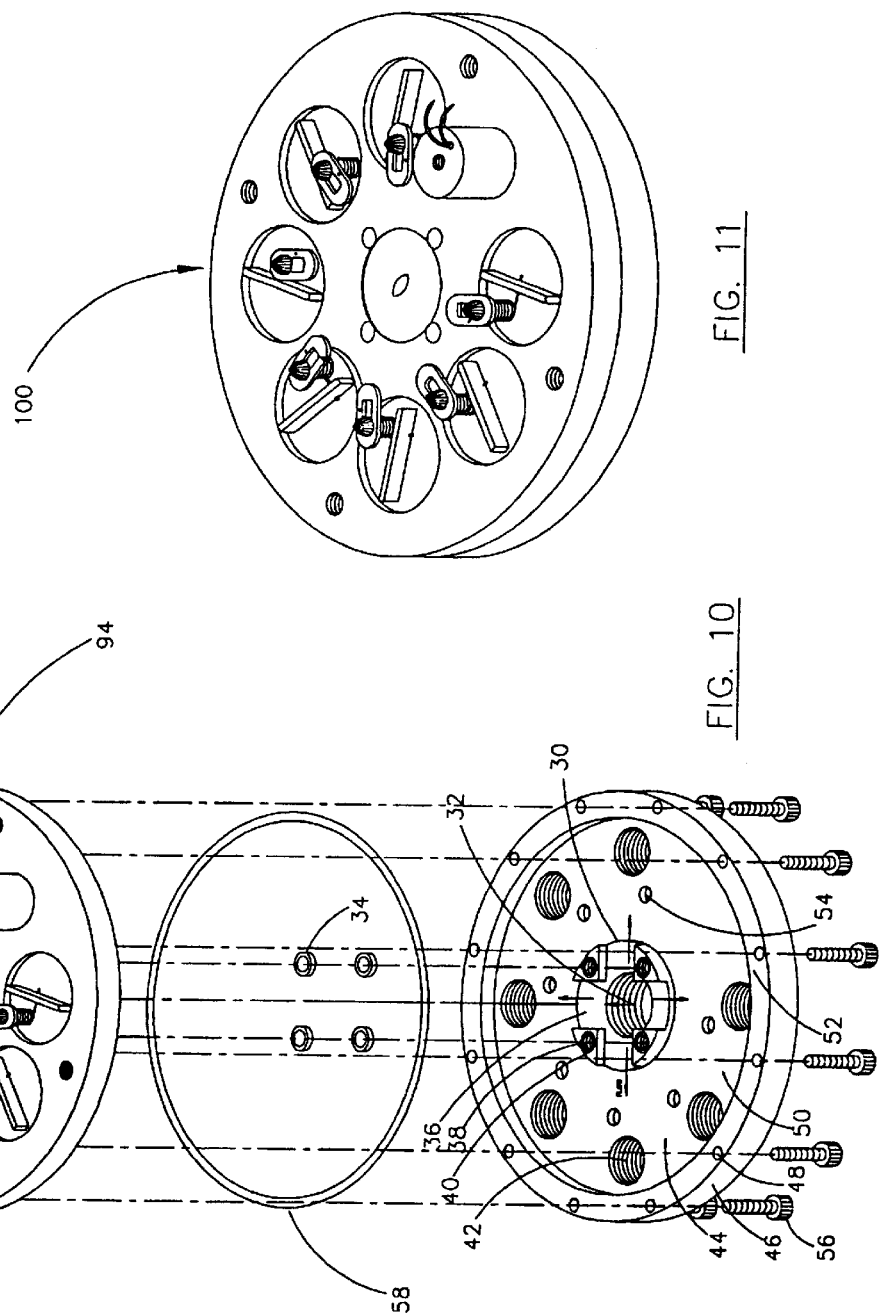

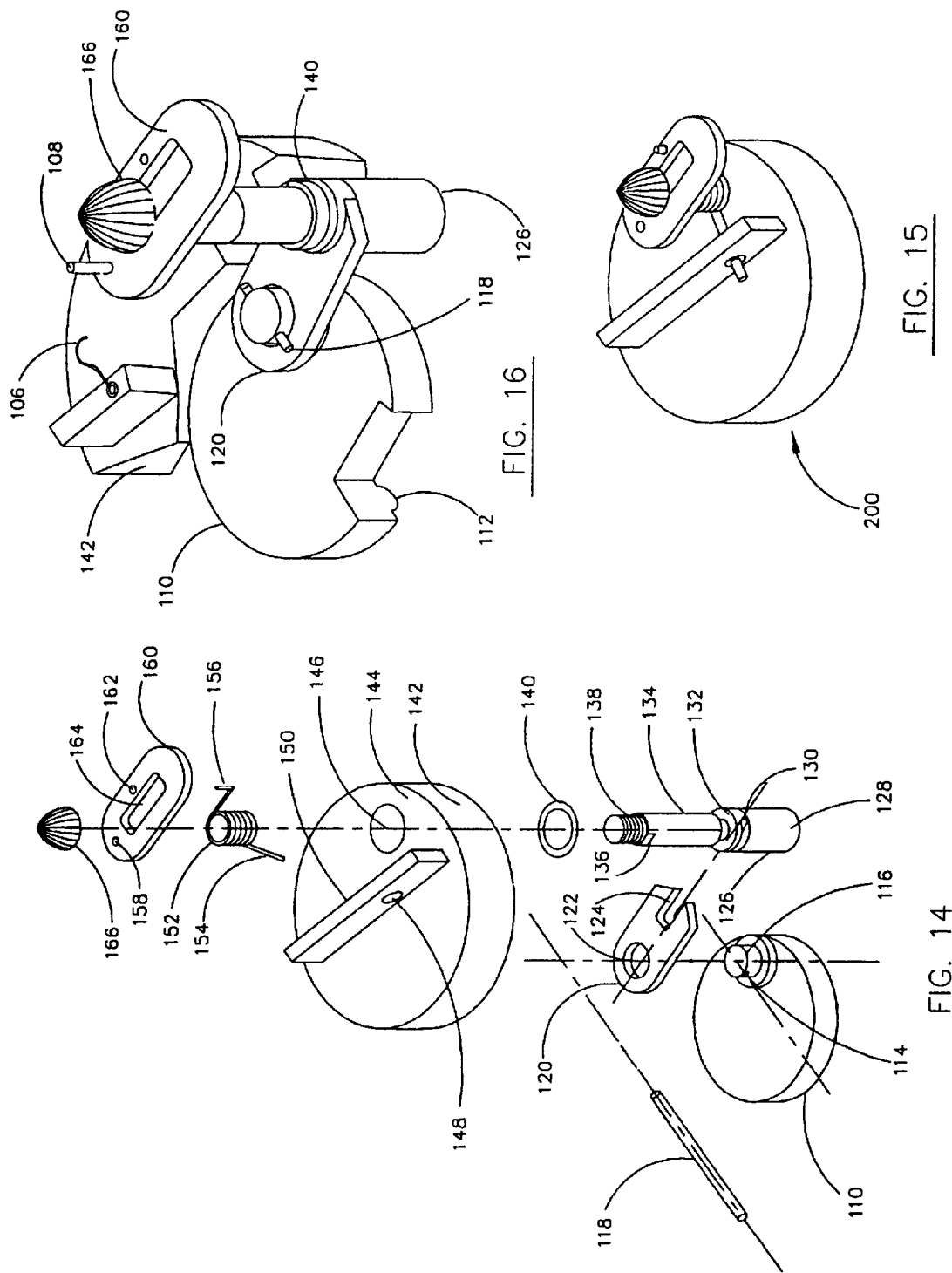

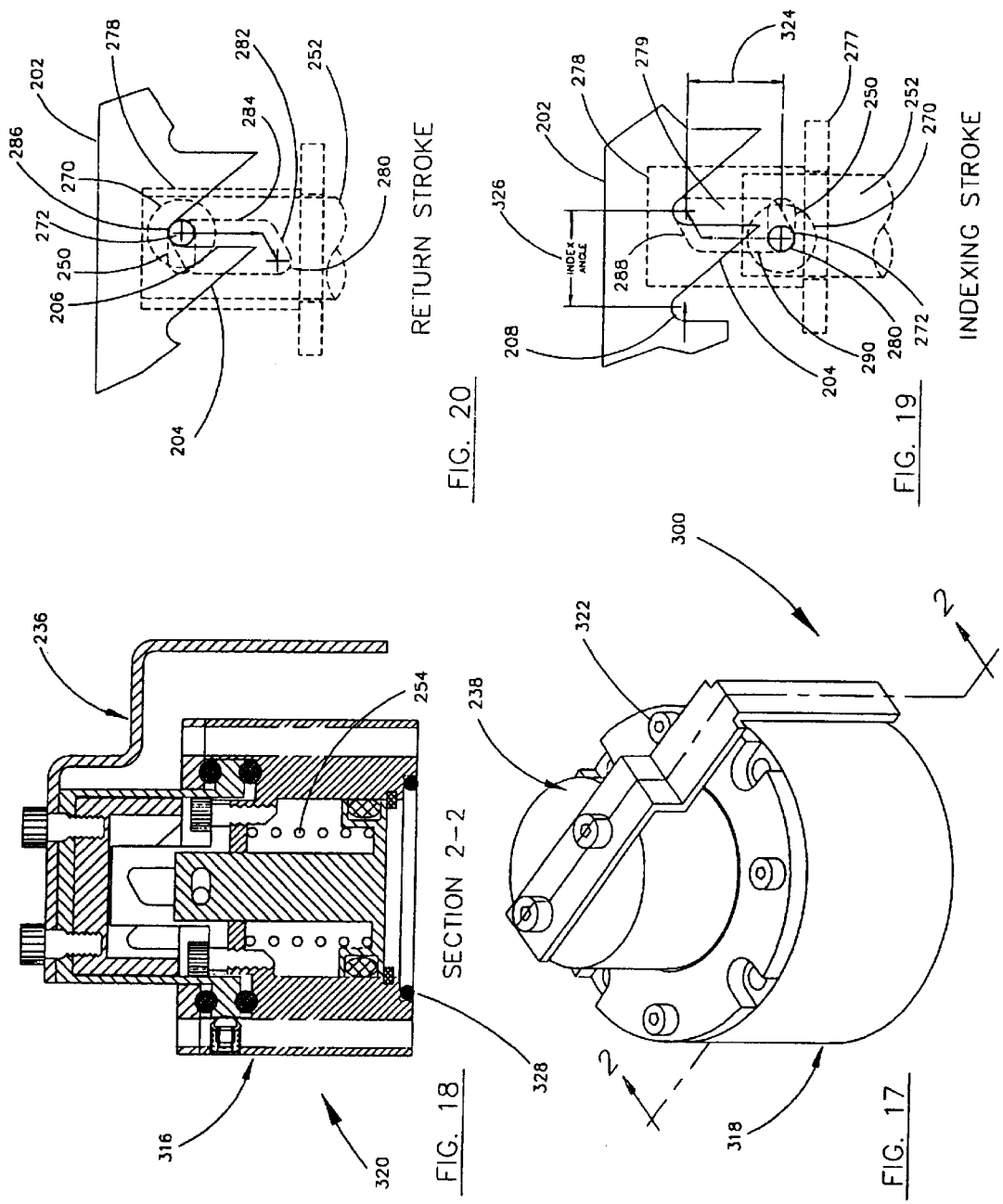

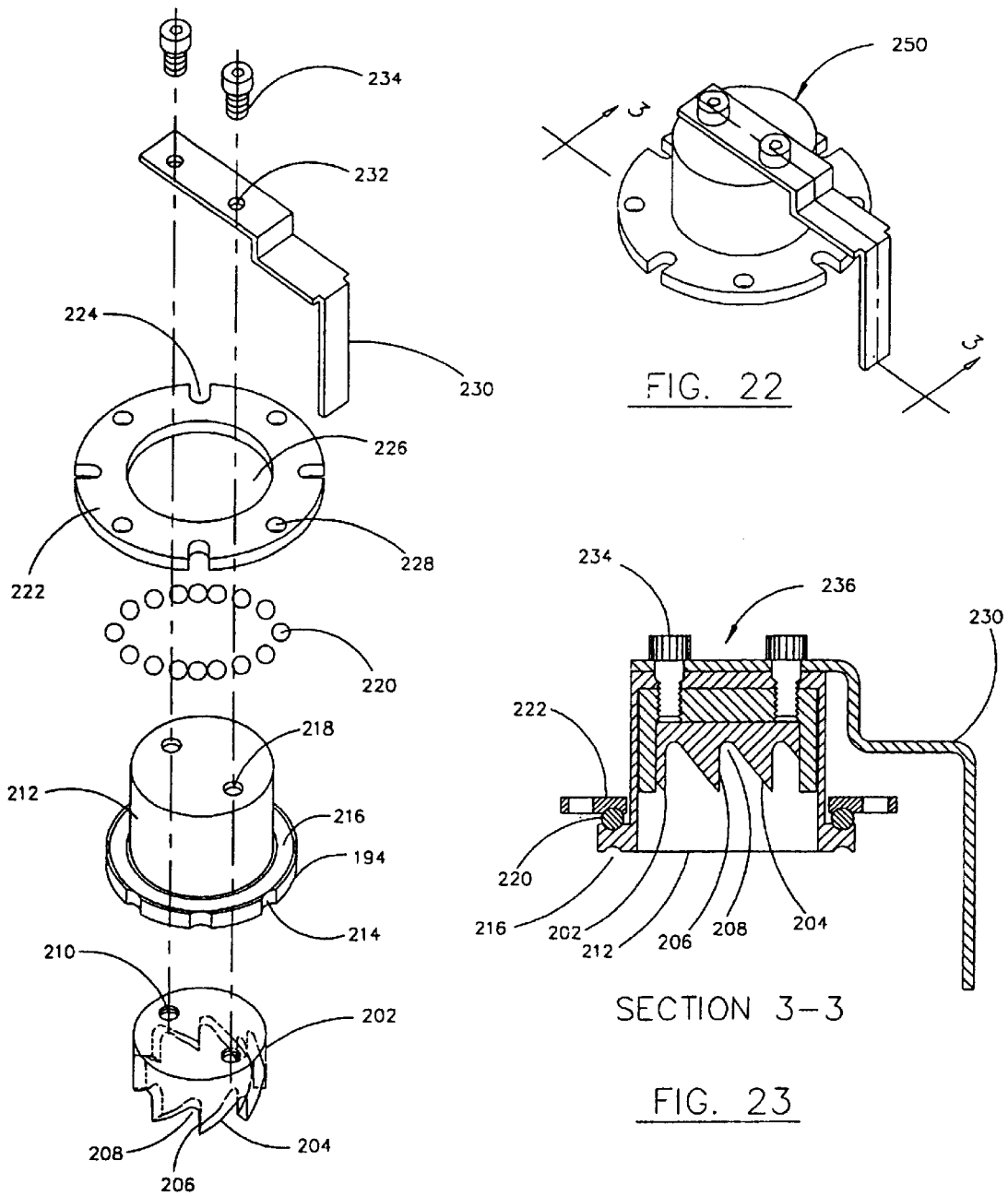

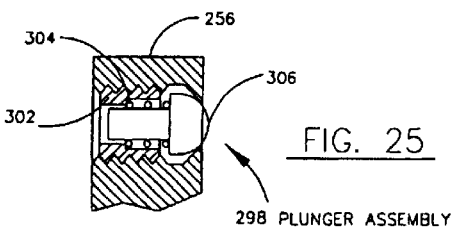
FIG. 25
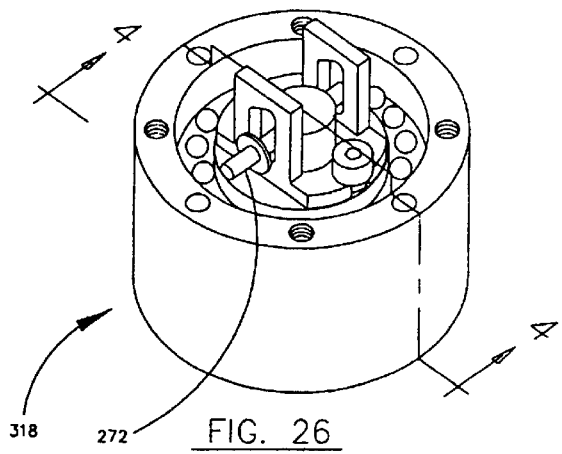
FIG. 26
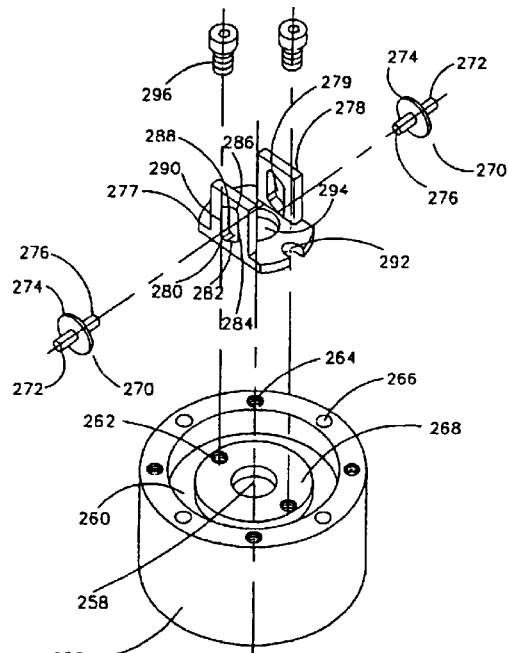
FIG. 24
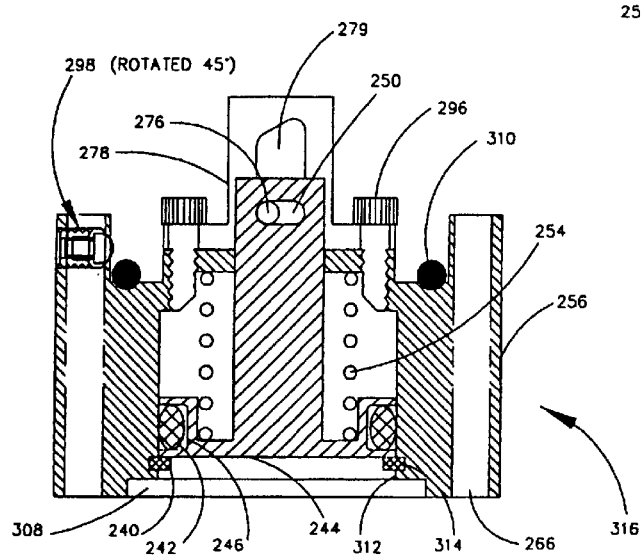
SECTION 4-4   FIG. 27

MULTIPLE OUTLETS SELF-ACTUATED IRRIGATION VALVE

RELATED APPLICATION

This application is a continuation of U.S. patent application Ser. No. 08/850,476, filed May 5, 1997, entitled Multiple Outlets Self-Actuated Irrigation Valve now U.S. Pat. No. 5,944,052, which is incorporated herein by reference and made a part of this application.

BACKGROUND OF THE INVENTION

Reduction in cost and simplicity in design along with water and energy conservation has long been an objective to produce a valve for use in domestic landscaping and agricultural and environmental irrigation.

1. Field of the Invention

The present invention relates to the field of valves and more specifically to a multi-ported irrigation valve having an indexing mechanism which opens each port sequentially after energizing momentarily, a three way solenoid valve controlled by a battery operated programmable timer.

2. Prior Art

Although the present invention may be suitable for use in a variety of applications to process different flowable fluids, it is however, adapted to be used as an automatic irrigation valve to divert water to different branches of an irrigation circuit. It has long been practiced to install an automatic sprinkler system for irrigation of residential, commercial, public and private parks and gulf courses. These sprinkler valves are well-known art, despite differences in their construction, they virtually comprise of two major members called the solenoid operated valves and a programmable timer. Majority of these valves are of diaphragm-actuated type and the driving timers are of crystal display types which normally operate with a 115 V. 60 Hz. Power source. Most diaphragm-actuated valves operate by applying inlet pressure through a restricted orifice into a chamber on one side of the diaphragm which acts against the diaphragm and causes the closure of the valve. When the solenoid is energized, the pressurized chamber is connected to exhaust and the valve opens. In some prior art the use of a latching or double solenoid has been employed for momentary application of power to control the position of the diaphragm thereby making the use of a battery operated timer possible. The disadvantageous features of these conventional approach are presented by the following U.S. patents that are relevant to the present invention:

U.S. Pat. No. 3,591,126 Hauser

U.S. Pat. No. 3,911,955 Gustav

U.S. Pat. No. 4,108,419 Sturman et al.

U.S. Pat. No. 4,981,280 The ARO Corporation

U.S. Pat. No. 3,591,126 to Hauser is directed to a diaphragm-actuated valve which operates by energizing a single solenoid. The disadvantages of this valve are it requires power to be maintained during the watering period and that each valve is capable of supplying water to a limited number of sprinkler heads only.

U.S. Pat. No. 3,911,955 to Gustav is directed to a single valve having two single solenoids, one opens and one closes the valve in tandem. This arrangement eliminates the requirements for continuous power supply and makes the use of battery operated timer possible, however, its disadvantages are that it requires two solenoids per valve and each valve can only supply flow to a limited number of sprinkler heads.

U.S. Pat. No. 4,108,419 to Struman et al is directed to a diaphragm-actuated valve which uses a battery operated controller to operate one or several valves in sequence. The disadvantages of this valve is that a group of similar valves are required to irrigate a large area and each of them must be wired in serial order to the previous valve.

U.S. Pat. No. 4,981,280 to The ARO Corporation is directed to a diaphragm-actuated valve which is normally closed due to the action of inlet pressure on one side of the diaphragm. When the solenoid or pilot operated exhaust is actuated, the valve opens and allows the fluid to flow. The disadvantages are that in an irrigation system, several of these valves are required to be assembled and wired to a timer.

SUMMARY OF THE INVENTION

The present invention overcomes all of the aforementioned disadvantages of the prior art. The advantageous features of the present inventions can be summarized as follow: This valve incorporate several disk valves inside a single housing located in radial pattern. Each disk valve is independently operable both manually or automatically and can be adjusted for flow rate relative to one another from outside of the housing. Automatic operation is sequential and is controlled by a battery operated programmable timer which generates a square pulse signal in a predetermined time intervals to energize momentarily a three way solenoid valve. When energized, the solenoid valve allows hydraulic pressure to actuate an indexing mechanism which by its interference action with a valve arm causes each disk valve to slide open in sequential order.

The present invention also provides a clearly advantageous unitary irrigation valve using a single solenoid and a built-in programmable timer which eliminates further wiring and manifolding in the field. As a result, this unique valve substantially reduces the costs of installing an irrigation system as compared to prior art system. Furthermore, the present invention uses several of the identical parts and has less total parts count and uses established manufacturing methods to produce, thereby significantly reducing the complexity of the overall system for ease of manufacturing, installation and maintenance.

OBJECTS OF THE INVENTION

It is therefore a principal object of the present invention to provide an improved multi-ported automatic valve primarily adapted for use in irrigation application which overcomes and significantly reduces the noted disadvantages of the prior art.

It is an additional object of the present invention to house several disk valves located in a radial pattern into a single and common housing with each disk valve being fully independent of one another and operable in both, manual and automatic mode.

It is still an additional object of the present invention to use a 3 way solenoid valve, momentarily energized, to allow fluid to enter the piston end of a cylinder and utilize the main inlet fluid pressure to cause a predetermined linear stroke of the piston rod.

It is still an additional object of the present invention to convert the linear displacement of the piston rod into a predetermined degree of rotational movement of an indexing arm.

It is still an additional object of the present invention to utilize the rotational movement of the indexing arm to cause opening of several disk valves within the fluid housing in sequential order.

It is an additional object of the present invention to provide adjustment to control flow rate and manually operate each valve external to valve housing.

It is still an additional object of the present invention to use a spring return mechanism to return the disk valve to its original position and to cover the opening for stoppage of fluid flow through the outlet port.

It is still an additional object of the present invention to provide an integrated, pre-wired, battery operated programmable timer to control the operation of the valve.

BRIEF DESCRIPTION OF THE DRAWING

The aforementioned objects and advantages of the present invention, as well as additional objects and advantages thereof, will be more fully understood hereinafter as a result of a detailed description of a preferred embodiment of the invention when taken in conjunction with the following drawings in which:

FIG. 3 is an isometric view of the present invention with programmable timer assembly opened;

FIG. 10 provide an exploded view of the valve housing assembly; and

FIG. 11 is an isometric view of the valve assembly;

FIGS. 14 through 16 provide exploded and assembly views of the disk valve;

FIGS. 17 and 18 are isometric and cross-sectional views of the indexing mechanism;

FIGS. 19 and 20 provide views of the path loop for a full index cycle.

FIG. 21 is an exploded view of the indexer; and

FIGS. 22 and 23 are isometric and cross-sectional views of indexer assembly;

FIG. 24 is an exploded view of the hydraulic cylinder assembly;

FIG. 25 provide a view of the plunger assembly; and

FIGS. 26 and 27 are isometric and cross-sectional views of the hydraulic cylinder assembly;

Present Invention Drawing Reference Numerals

Figure 1:
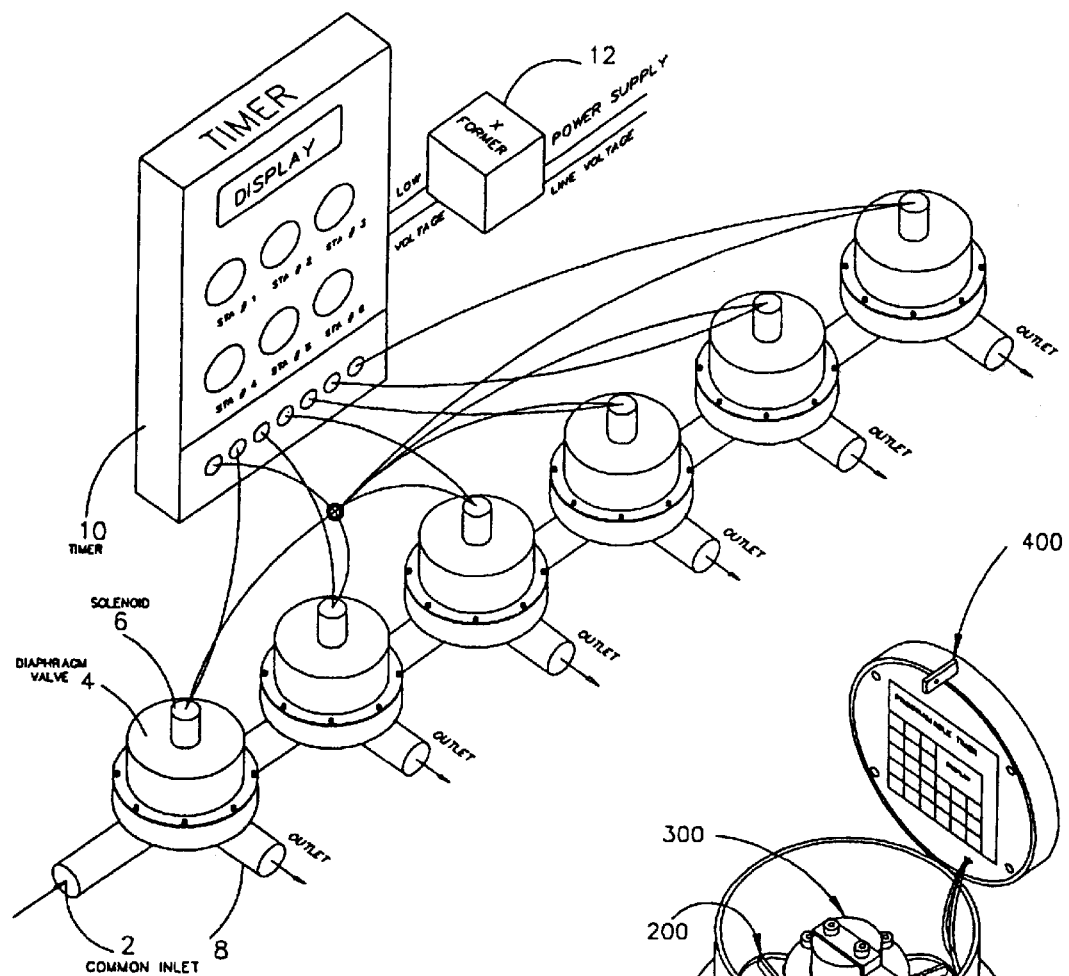
FIG. 1 is an isometric diagram of an prior art sprinkler system including valves, solenoids, timer, power regulation transformer and wiring.

| Part Name | Part Name | Part Name |
|---|---|---|
| 30 center boss | 74 clearance holes | 118 pin |
| 32 inlet port | 76 counter bore | 120 fork |
| 34 "O" rings | 78 cross hole | 122 hole |
| 36 cross cuts | 80 "O" rings | 124 grip |
| 38 tap holes | 82 retaining rings | 126 shaft |
| 40 counter bores | 84 "O" ring | 128 shaft base |
| 42 outlet ports | 86 Male thread | 130 slots |
| 44 inter outlets space | 88 solenoid | 132 groove |
| 46 lower housing | 90 vent port | 134 shaft shank |
| 48 clearance holes | 92 lead wires | 136 flats |
| 50 housing floor | 94 valve cover assembly | 138 thread |
| 52 seal surface | 96 Not Used | 140 "O" ring |
| 54 socket hole | 98 N/U | 142 plug |
| 56 screws | 100 valve housing assembly | 144 plug top surface |
| 58 "O" ring | 102 N/U | 146 hole |
| 60 housing cover | 104 N/U | 148 spring hole |
| 62 holes | 106 hook | 150 handle |
| 64 counter bores | 108 pin | 152 spring |
| 66 seal seats | 110 disk | 154 lower spring leg |
| 68 grooves | 112 seal | 156 upper spring leg |
| 70 solenoid cavity tap | 114 pin hole | 158 holding hole |
| 72 blind tap | 116 shaft | 160 valve arm |
| 162 wire hole | 206 vertical flank | 250 slot |
| 164 adjusting slot | 208 crown | 252 rod |
| 166 acorn nut | 210 tap hole | 254 spring |
| 168 screws | 212 indexer cover | 256 cylinder |
| 170 outlet connection | 214 notch | 258 hole |
| 172 inlet connection | 216 groove | 260 groove |
| 174 orifice | 218 clearance hole | 262 tap |
| 176 fluid chamber | 220 bearing balls | 264 tap |
| 178 tap | 222 thrust washer | 266 hole |
| 180 sgroove | 224 clearance notch | 268 pad |
| 182 plunger seal | 226 clearance hole | 270 flanged pins |
| 184 drain tube | 228 clearance hole | 272 indexer pin |
| 186 piston cavity | 230 indexing arm | 274 flange |

-continued

Present Invention Drawing Reference Numerals

| Part Name | Part Name | Part Name |
|---|---|---|
| 188 solenoid cavity | 232 clearance hole | 276 rod pin |
| 190 protective cover | 234 screw | 277 guide bracket |
| 192 screws | 236 indexer cross-section | 278 vertical walls |
| 194 flange | 238 indexer assembly | 279 guide loop |
| 196 Not Used | 240 retaining ring | 280 lower pin stop |
| 198 N/U | 242 seal ring | 282 lower guide ramp |
| 200 disk valve assembly | 244 piston | 284 return guide side |
| 202 indexer | 246 groove | 286 upper pin stop |
| 204 ramp | 248 spring seat | 288 upper guide ramp |
| 290 indexing guide side | | |
| 292 notch | | |
| 294 hole | | |
| 296 screws | | |
| 298 plunger assembly | | |
| 300 indexing mechanism | | |
| 302 set screw | | |
| 304 spring | | |
| 306 plunger | | |
| 308 counter bore | | |
| 310 lower bearing balls | | |
| 312 cylinder inside diameter | | |
| 314 groove | | |
| 316 cylinder cross-section view | | |
| 318 cylinder assembly view | | |
| 320 index mech. cross-sec. | | |
| 322 screw | | |
| 324 piston strokes | | |
| 326 index angle | | |
| 328 "O" ring | | |

DETAILED DESCRIPTION OF PREFERRED EMBODIMENT

Referring now to FIG. 1. There is shown an exemplary installation of the prior art comprising a common inlet pipe 2 with several diaphragm actuated valves 4, each operated by a solenoid 6 allowing flow through outlet 8 when controlled by a timer 10 and powered by a step-down transformer 12.

Figure 2:
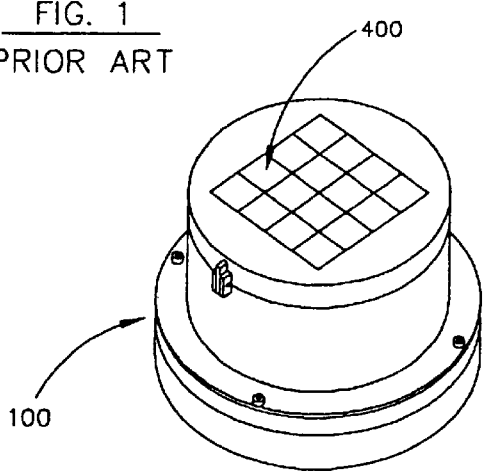
FIG. 2 is an isometric view of the present invention showing solar cells as alternate power supply.
Figure 4:
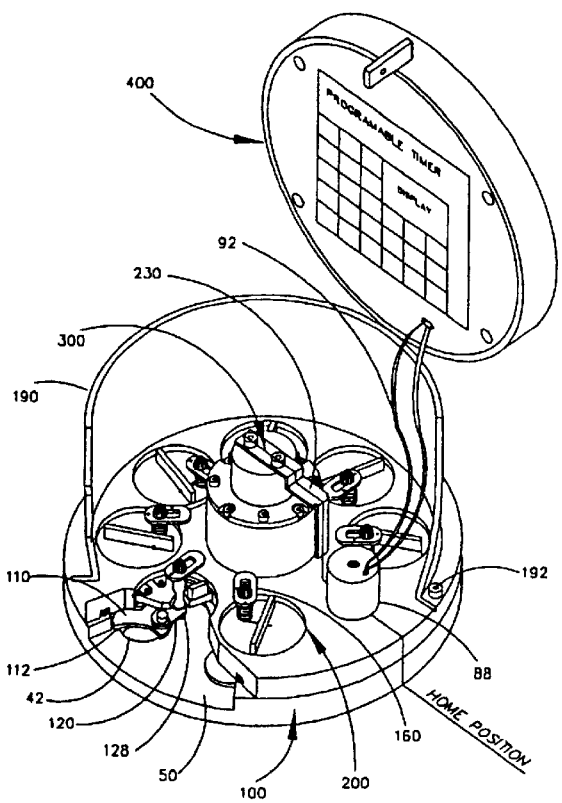
FIG. 4 provides a view of the indexing mechanism with cut-away view of the disk valve assembly.

In the present invention there are no exposed electrical connections and as shown in FIGS. 2, 3 and 4, a plurality of disk valve assemblies 200, are packaged in a unitary valve housing 100, and a three-way solenoid 88 is connected to a timer 400 by lead wire 92. These features of the valve provide substantial advantages over the prior art.

Figure 7:
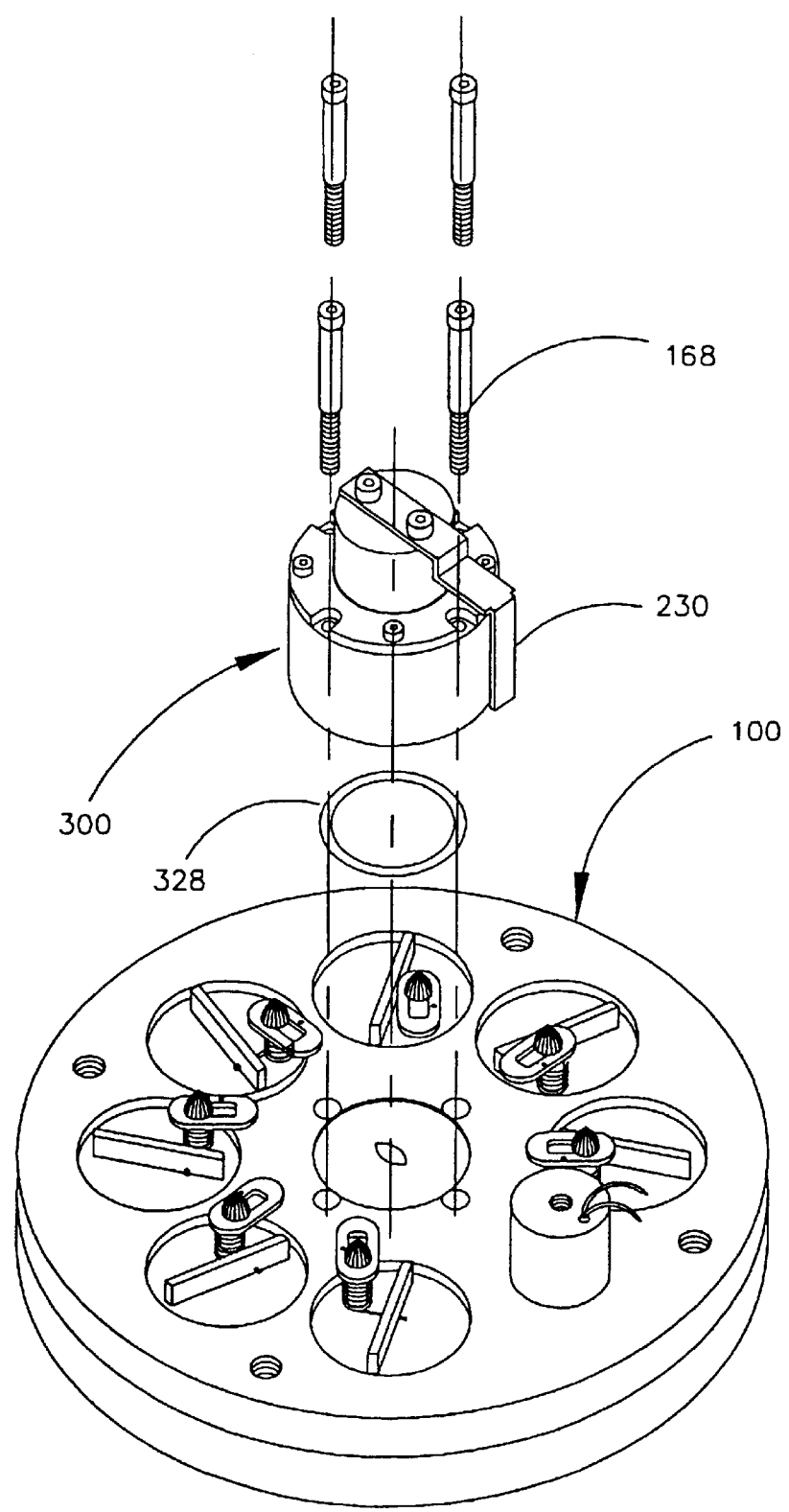
FIG. 7 provide an exploded view of assembling the indexing mechanism to the valve housing assembly.
Figure 8:
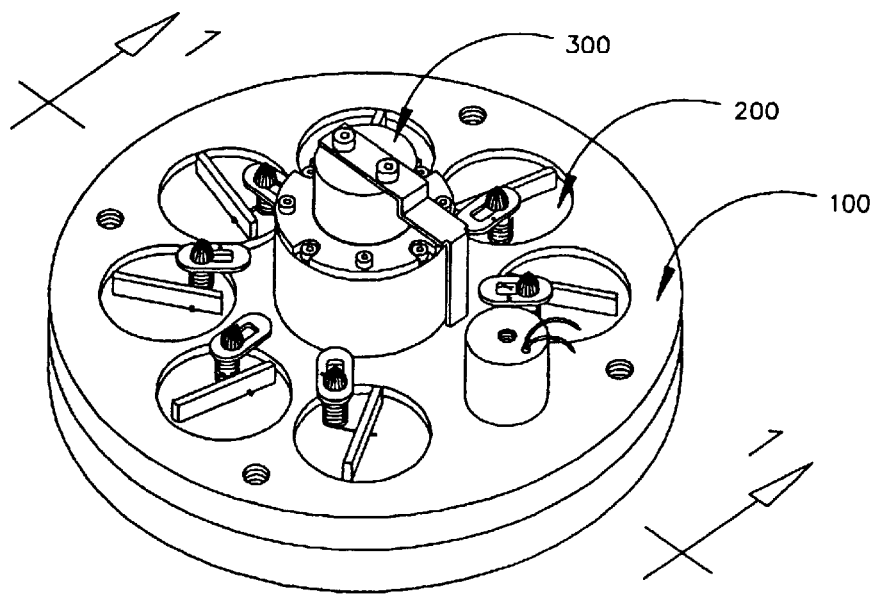
FIG. 8 is an isometric view of the valve housing and the indexing assembly.

The present invention as shown in FIGS. 2 and 3 comprises a valve-housing assembly 100, a plurality of disk valve assemblies 200, an indexing mechanism 300 and a timer assembly 400. A protective cover 190 with the timer assembly 400 being hinged thereon is mounted to the valve-housing assembly 100 by screws 192. It will be understood that the timer per se does not form a part of the present invention but is disclosed herein for purpose of fully describing the manner in which the present invention operates with such a timer. As seen in FIG. 4, the present invention comprises a hydraulically actuated indexing mechanism 300, a plurality of disk valve assemblies 200, a valve-housing assembly 100 and a three-way solenoid valve 88. The indexing mechanism as shown in FIG. 7, is joined to the valve-housing assembly using screws 168 with an "O" ring seal 328 and is oriented so that under no operating condition, its indexing arm 230 is in "home position". As shown in FIG. 8 and SECTION 1—1 in FIG. 9, the indexing mechanism as will be described in detail in a second embodiment disclosed herein, is mounted concentrically to the valve-housing assembly 100.

Figure 9:
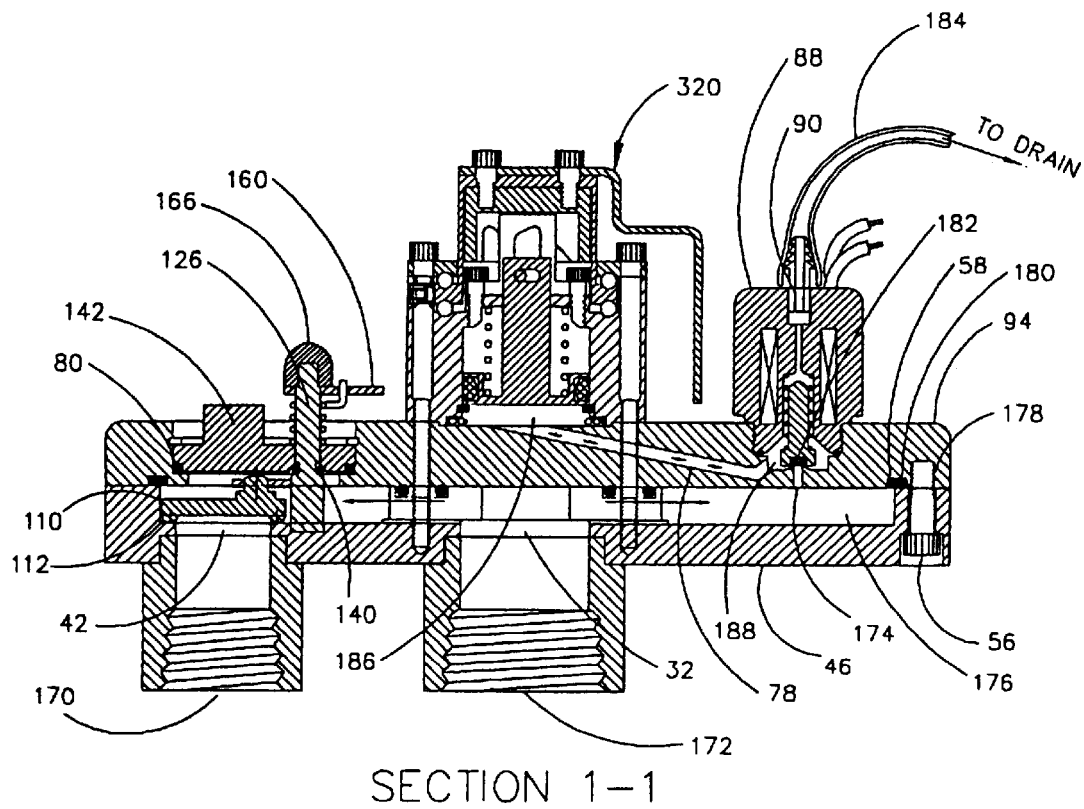
FIG. 9 is a cross sectional view of the valve housing and the indexing mechanism illustrating its operation.

Reference will now be made to FIG. 10 and 11 for a more detailed description of the various parts comprising the valve-housing assembly 100 as shown in FIG. 11. More specifically, as shown in FIG. 10, a lower housing 46 receives a valve cover assembly 94 with an "O" ring 58 and number of smaller "O" rings 34 to provide hydraulic seal between mating surfaces 52 and 40. As seen in FIGS. 9 and 10, a number of appropriately sized screws 56 are threaded into an equal number of appropriately deepened taps 178 through clearance holes 48 to provide mechanical integration and hydraulic sealing as the "O" ring 58 fills the seal groove 180 and the "o" rings 34 seat in counter bores 40. As seen further in FIG. 10, the lower housing 46 has a common inlet port 32 centrally located relative to a raised boss 30 having cross cuts 36 and blind tap holes 38 concentric with counter bores 40. A plurality of outlet ports 42 equally spaced in a pre-determined radial pattern are machined through the floor and flushed smoothly to floor surface 50. Furthermore, corresponding to each outlet port 42, and in a specific relation to it, there is a blind counter bore 54 located on the surface floor 50 to receive a shaft base 128 shown in FIG. 14, when assembly 100 in FIG. 10 is made.

Figure 13:
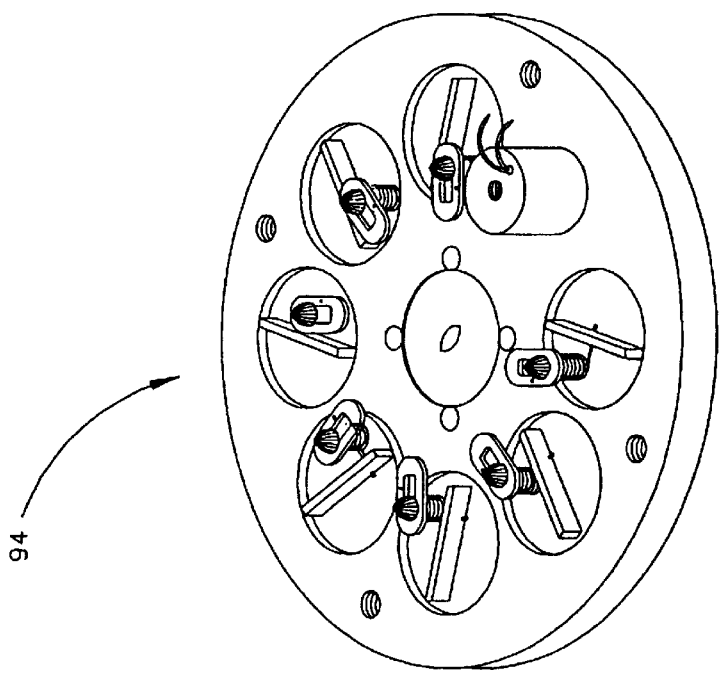
FIG. 13 is an isometric view of the valve cover assembly.
Figure 12:
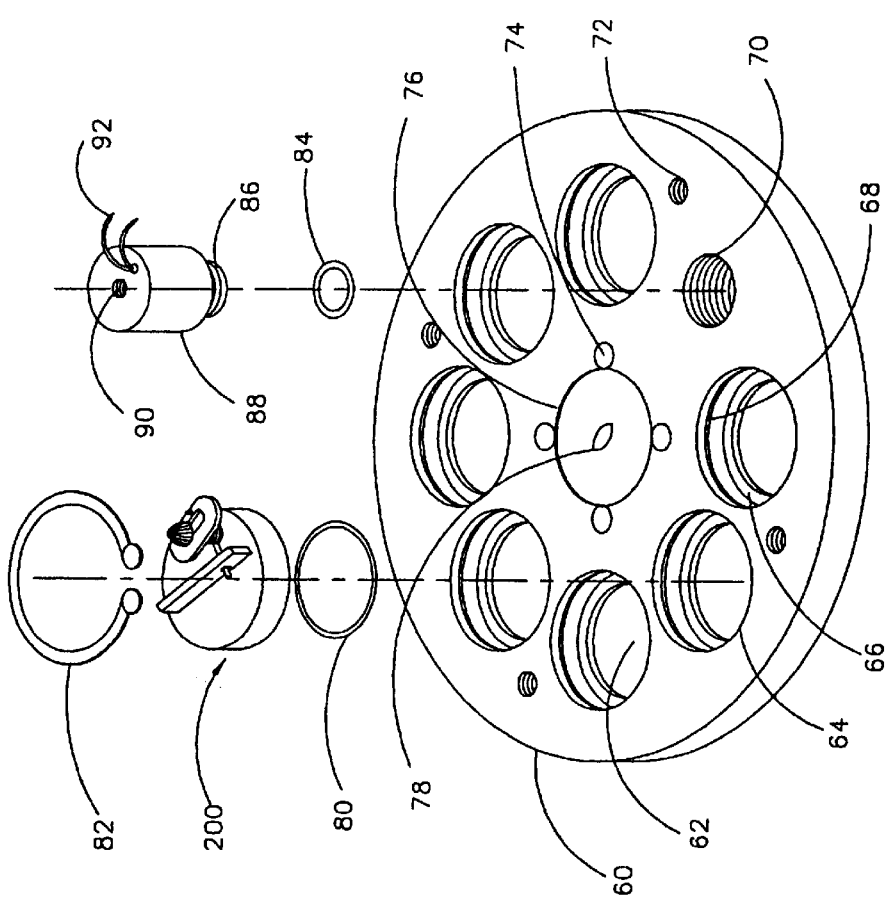
FIG. 12 provide an exploded view of the disk valve cover assembly.

Referring now to FIG. 12 an exploded view is shown for a more detailed description of the components comprising the valve-cover assembly 94 as shown in FIG. 13. As seen in FIG. 12 and 13, two of the principle components of the present invention are a disk valve assembly 200 and a three-way solenoid valve 88 that are assembled to a housing cover 60. A plurality of equally spaced holes 62 concentric with counter bores 64 are machined in a predetermined radial pattern into a disk plate which makes the housing cover 60. A' the bottom of the counter bore 64, a ledge or a seat 66 is formed between the counter bore diameter and hole 62. A retaining ring groove 68 of predetermined size is machined on the inside diameter of counter bore. A solenoid cavity tap 70 receives an "O" ring 84 and male till thread 86 of solenoid 88. The disk valve assembly 200, in a predefined orientation, is placed into the counter bore, after an "O" ring 80 is placed on seal seat 66. A retaining ring 82 then, secures the disk valve assembly by placing it into groove 68 and over lapping plug top surface 144. An additional counter bore 76 and plurality of clearance holes 74 are provided for subsequent assembly of the indexing mechanism 300. Tap holes 72 are provided to mount protective cover 190 as shown in FIG. 3. Further more, referring simultaneously to FIGS. 9 and 12, a cross hole 78 connects a piston cavity 186 to a solenoid cavity 188 for bi-directional fluid flow each time the solenoid operates.

Reference will now be made to FIG. 14, 15 and 16 for a detailed description of components comprising the disk valve assembly 200. By referring to the exploded view in FIG. 14, it will be observed that a disk 110 having a hole 114 through a shaft 116 and a round seal ring 112 as shown in a cut-away view in FIG.16, is assembled to a fork 120 through hole 122 using a pin 118. Further more, shaft 126 having several features including a base 128, slot cuts 130 on both sides, a groove 132, a shank 134, flats 136 on both sides and threaded end 138, receives fork grabs 124 through slot cuts 130. Shaft 126 is also adapted to receive an "O" ring 140 into groove 132 before it is inserted through hole 146 of plug 142. In addition, the plug 142 has a finished top surface 144 a handle 150 with a hole 148 to receive lower leg 154 of a spring 152. An upper leg 156 of the spring 152 is inserted into a hole 162 of valve arm 160. The valve Arm has an elongated slot 164 to drop on shaft flats 136 which will be secured to the shaft by an acorn nut 166. An additional hole 158 is provided to keep the disk valve assembly in open position during manual operation. Further observation of FIGS. 16 and 15 reveals that the disk valve assembly can easily be installed in a pre-determined orientation through the hole 62 of FIG. 12 with shaft base 128 placed in counter bore 54 in FIG. 10.

A SECOND EMBODIMENT

Reference will now be made to FIG. 17 which illustrate a second embodiment of the present invention in which an indexing mechanism 300 is further comprised of an indexer assembly 238 as shown in FIG. 22 and a cylinder assembly 318 as shown in FIG. 26 joined by screws 322. Further more, SECTION 2—2 in FIG. 18, shows indexing mechanism cross-section 320 comprising of indexer cross-section 236 as shown by section 3—3 of FIG. 23 and the cylinder assembly cross-section as shown in SECTION 4—4 in FIG. 27. More specifically, as shown in FIGS. 19 and 20 the indexing mechanism converts a predefined linear motion 324 into a corresponding angular motion 326 of an actuating arm 230 as shown in FIG. 23.

Referring now to the exploded view in FIG. 21, more detailed description of the components comprising the indexer assembly will be provided.

As seen in FIG. 21 the present invention comprises a cup shaped circular indexer 202 having a plurality of serration of a specific geometry with a ramp 204, a vertical flank 206 a radiused crown 208 and tap holes 210 of specific orientation located on top. Further more, a hat shaped indexer cover 212 having similar grooves 216 on top and bottom sides of flange 194 to receive bearing balls 220. In addition, a plurality of notches 214, equally spaced, are made on the flange outside diameter and clearance holes 218 are located on top with the same orientation as tap holes 210 in the indexer 202. As seen further in FIG. 21, a thrust washer 222 having an even number of clearance notches 224 and mounting holes 228 with a clearance hole 226 slides over the indexer cover resting on the bearing balls 220. An indexing arm 230 having clearance holes 232 is aligned with tile indexer tap holes and is secured in place by screws 234. FIGS. 22 and 23 provide an isometric view 238 and cross-sectional view 236 of the indexer assembly.

Reference will now be made to FIGS. 24 through 27 for a detailed description of tile components comprising cylinder assembly 316 of the invention. By referring to FIGS. 24 and 27 simultaneously, it can be observed that a cylinder 256 is fabricated having an inside diameter 312, a counter bore 308, a groove 314 on the inside diameter, an additional groove 260, a clearance hole 258, mounting tap holes 262 on mounting pad 268, an even number of tap holes 264 and clearance holes 266 corresponding to the number of clearance notches 224 and holes 228 on thrust washer 222 shown in FIG.21. As also seen in FIG. 24, a piston 244 having a rod 252, spring seat 248, a groove 246 and slot 250 is adapted to fit inside cylinder 256 with a spring 254 placed around the rod 252 and after an "O" ring 242 is placed in groove 246. A retaining ring 240 is placed into groove 314 provide a pre determined bias force on spring 254 and keeps slot 250 in a predetermined position relative to top of pad 268. Further more, a guide bracket 277 having a clearance hole 294, notche 292 at 180 degree apart, and two vertical walls 278 each having a guide loop 279 machined opposite of one another. Details of the guide loop 279 is further described as having a lower pin stop 280, a lower ramp 282, a return guide side 284, an upper pin stop 286, an upper ramp 288 and an indexing guide side 290. As seen in FIGS. 24 and 27, The guide bracket 277 is mounted to cylinder pad 268 secured by screws 296. At this position, the center of the lower pin stops 280 coincides with the centers of the elongated slot 250 in rod 252 and pins 276 of flanged pins 270 are inserted from both guide loops 279 in vertical walls 278 into rod slot 250. The flanges 274 control insertion depth of pins 276 thereby preventing interference at the center of the rod slot. During subsequent assembly of indexer assembly 236 in FIG. 23 to cylinder assembly 316 in FIG. 27, pins 272 of flanged pins 270 will be located directly below the ramps 204 of indexer 202 in a specific way as shown in FIG. 19.

Referring now to FIG. 25 there is shown a detail of an plunger assembly 298 comprising of a hallow set screw 302, a spring 304 and a plunger 306. As seen in FIG. 18, the plunger 306 engages the notch 214 of indexer cap 212 in FIG. 21, thus preventing free rotating of the indexer assembly 236.

OPERATION OF INVENTION

Figure 5:
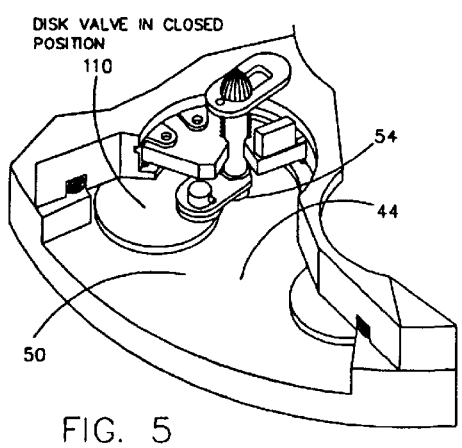
FIGS. 5 and 6 provide enlarged views of the disk valve in closed and open positions.

Referring now to FIGS. 4 and 5, the initial state of the indexing arm 230 is shown at home position and the disk 110 is in closed position covering outlet port 42. As seen further in SECTION 1—1 of FIG. 9, pressurized fluid enters through inlet connection 172 filling fluid chamber 176 by passing through cross-cuts 36 in FIG. 10. a plunger seal 182 of the three-way solenoid valve 88 is spring biased against orifice 174 preventing flow of pressurized fluid while allowing piston cavity 186 to be vented through cross-hole 78 to solenoid cavity 188 passing further through a vent hole 90 into drain tube 184.

Cycling starts by energizing solenoid valve 88 for a specific time period during which orifice 174 opens while vent hole 90 closes thus allowing pressurized fluid to enter piston cavity 186 via solenoid cavity 188 and cross hole 78, developing sufficient force to cause linear displacement of the piston by a predetermined stroke 324 as shown in FIG. 19. FIGS. 19 and 20 demonstrate further the dynamic sequencing of converting the linear stroke 324 into rotational index angle 326. More specifically, as the piston rod 252 moves flanged pins 270 in vertical direction along the indexing guide side 290, it will engage pins 272 with ramps 204 and causes the indexer 202 to rotate. Rotation continues as pins 270 follow upper ramps 288 while moving horizontally toward the center of the slot 250 until the radiused crown 208 of the indexer is aligned with the upper pin stop 286 of the loop guide 279 as shown in FIG. 20. FIG. 20 illustrates return stroke path of the flanged pins 270 forced by the compression spring disk connected within said chamber, in an eccentric relation to said shaft, and external to said plug, an adjustable arm is attached to said shaft to provide sliding motion of said disk over said outlet 254 in FIG. 18. This return is initiated when the solenoid 88 in FIG. 9 is deenergized, causing orifice 174 to close and allowing fluid from piston cavity 186 to be vented through the drain tube 184. As seen in FIG. 20, pins are guided by return guide side 284 and vertical flank 206 of the indexer 202. Pins are further guided by lower ramps 282 until they are returned to lower pin stop 280 thus completing an incremental index. This action is repeated each time the solenoid is energized and then de-energized within a specific time period.

Figure 6:
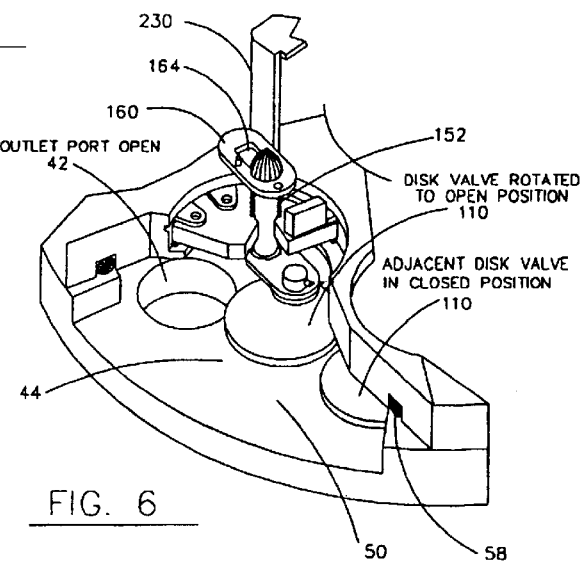

Referring now to FIGS. 4 and 6, it will be seen that as the indexing arm 230 completes an incremental index, it causes mechanical interference with the valve arm 160 and causes the shaft 126 of disk valve assembly 200 in FIG. 16, to pivot in the counter bore hole 54 shown in FIG. 10, thereby rotating disk 110 over the housing floor 50 to the inter-outlets space 44 allowing full opening of the outlet port 42 for fluid flow through outlet connection 170 shown in FIG. 9. As shown further in FIG. 6, an adjusting slot 164 in valve arm 160 allows the amount of interference with the indexing arm to be adjusted, thereby controlling the valve opening from zero to full position for variable flow rate. As seen in FIG. 6 Disk 110 remains in this condition until the next incremental index is initiated by the timer signal to the solenoid. Once the indexing arm 230 disengages valve arm 160, a torsion spring 152 returns disk 110 to its original closed position as shown in FIG. 5 thereby stopping flow from flowing through port 42 and outlet connection 170. Sequential operation of each disk valve proceeds in this manner until the indexing arm is returned to its home position and waits for the next cycle to be initiated. As seen in FIG. 16, at any time between or during cycles, a rotatable hook 106 can be placed around pin 108 to keep valve in open position thereby making manual operation of each valve possible.

CONCLUSION, RAMIFICATIONS, AND SCOPE OF INVENTION

In conclusion, the object of this invention is that by replacing the prior art with the present invention a more compact and energy efficient irrigation system which requires less manufactured parts and takes less time to assemble and install in the field. By maintaining its principle of operation while changing material of construction, this valve can be adapted for use in processing other liquid chemicals used in the fluid handling industry. In addition, the number of the valve outlets can vary from three to multitude of ports, with port size variation from fraction of an inch to several inches in diameter for large fluid handling projects. Additional safety features can be incorporated into this valve such as, adding another battery operated automatic shut-off valve to the main inlet line which opens at the beginning of each cycle and closes at the end of total cycle time. This valve will use the same timer circuitry but different batteries to operate it. Yet another option is to provide an anti siphoning valve at the main inlet port or provide individual ones at each outlet ports.

Although preferred embodiments and the best mode operation of of the present invention have been disclosed in sufficient detail to enable one skilled in the art to make and use the invention, it will now be understood that various modifications may be made to the specific configurations and components disclosed herein, but that all such changes are contemplated to be within the scope of the invention which is to be limited only by the appended claims:

I claim:

1. A device for regulating the flow of fluid, including
   an indexing mechanism mounted to rotate in a step wise fashion in response to fluid entering the indexing mechanism, said fluid draining from the indexing mechanism after rotating through a step, and
   an electronically actuated valve that, upon being actuated by an electrical signal, opens for a specific time period to allow fluid into the indexing mechanism to move the indexing mechanism though one step.

2. The device of claim 1 where the indexing mechanism includes a piston seated in a chamber, said fluid entering the chamber to move the piston linearly through a stroke, and means, responsive to the linear stroke of the piston, that rotates the indexing mechanism one step.

3. The device of claim 2 where the means includes a guide that engages a follower element attached to the piston.

* * * * *